United States Patent [19]

Larsen et al.

[11] 4,072,398
[45] Feb. 7, 1978

[54] COMMUNICATION CABLE

[75] Inventors: Herbert Larsen, Munich; Güenter Zeidler, Unterpfaffenhofen; Dieter Schicketanz, Munich, all of Germany

[73] Assignee: Siemens Aktiengesellschaft, Berlin & Munich, Germany

[21] Appl. No.: 698,153

[22] Filed: June 21, 1976

Related U.S. Application Data

[63] Continuation of Ser. No. 433,310, Jan. 14, 1974, abandoned.

[30] Foreign Application Priority Data

Jan. 19, 1973 Germany .............................. 2302662

[51] Int. Cl.² .............................................. G02B 5/16
[52] U.S. Cl. ................................................. 350/96.23
[58] Field of Search ................. 350/96 R, 96 B, 96 C, 350/96 WC

[56] References Cited

U.S. PATENT DOCUMENTS

| | | | |
|---|---|---|---|
| 3,050,907 | 8/1962 | Hicks et al. | 350/96 B X |
| 3,315,160 | 4/1967 | Goodman | 350/96 C X |
| 3,660,590 | 5/1972 | Conant | 350/96 B X |
| 3,699,950 | 10/1972 | Humphrey et al. | 350/96 C X |
| 3,740,116 | 6/1973 | Andrews | 350/96 B |
| 3,766,307 | 10/1973 | Andrews | 350/96 B X |
| 3,798,099 | 3/1974 | Marcatili | 350/96 B X |
| 3,817,595 | 6/1974 | Edelman et al. | 350/96 B X |
| 3,847,483 | 11/1974 | Shaw et al. | 350/96 B X |
| 3,865,466 | 2/1975 | Slaughter | 350/96 B |

Primary Examiner—David H. Rubin
Attorney, Agent, or Firm—Hill, Gross, Simpson, Van Santen, Steadman, Chiara & Simpson

[57] ABSTRACT

A communication cable is composed of a number of optical fibers with an outer coating, loosely twisted together to form basic groups, provided with tension-relieving wires and sheathed to form a cable while filling the interspaces with lubricants.

2 Claims, 2 Drawing Figures

COMMUNICATION CABLE

CROSS REFERENCE TO RELATED APPLICATION

This is a continuation of U.S. Pat. application Ser. No. 433,310, filed Jan. 14, 1974 and now abandoned.

BACKGROUND OF THE INVENTION

It is common in communications engineering to transmit information through conventional electrical cables. Such a cable may contain a large number of conductors with numerous information channels. However, such communication cables are very limited in their transmission capacity since the transmission band width of each conductor, as well as the possible number of conductors which can be combined in a cable, is limited.

Optical wave guides have substantially wider transmission bands. In addition they are very thin, and it would appear possible to combine a considerable number of such wave guides within one cable and thus to obtain a far greater transmission capacity than with conventional communication cables.

However, it is not possible to simply combine these optical wave guides in the same manner as a prior-art electric communication cable, and it is thus important to design communication cables which are to be used in connection with optical fibers.

SUMMARY OF THE INVENTION

Optical wave guides are combined in the same manner as prior-art electric communication cables, and it is thus important to design communication cables which are to be used in connection with optical fibers. The cable is supposed to be resistant to mechanical, thermal and chemical influences.

In order to obtain this goal, the optical fibers are first provided with a protective coating which will prevent leaking of the information or cross-talk effects, and they are then loosely twisted together with a finite stranding pitch to form basic groups which are then sheathed. Several basic groups are combined with at least one tension-relieving wire, and they are then provided with a first protective sheath, leaving a certain degree of clearance. A metal foil is arranged upon the first protective sheath and a second protective sheath is placed thereupon. The interspaces between the optical fibers and the protective layer of the basic groups as well as the interspaces between the basic groups, the tension-relieving wire or wires and the first protective sheath of the cable are filled by a lubricant, which allows relative movement of all these individual members.

For an easier distinction of the various basic groups of optical fibers, in particular for repair purposes, they may be provided with color codings.

BRIEF DESCRIPTION OF THE DRAWINGS

Other objects, features and advantages of the invention will be apparent from the following description of a preferred embodiment thereof, taken in conjunction with the accompanying drawings, although variations and modifications may be made without departing from the spirit and scope of the novel concepts of the disclosure herein, whereby.

DESCRIPTION OF THE PREFERRED EMBODIMENT

Figure 2:
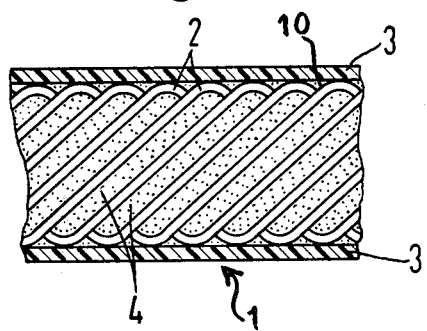
FIG. 2 is a cross-sectional side view of a basic group of optical fibers.

According to a preferred embodiment of this invention, optical fibers 2 with diameters of a few tenths of a millimeter are provided with an outer protective coating 10, as this is particularly shown in FIG. 2. This outer protective coating is flexible and has a low coefficient of friction as well as high absorption, and it is not susceptible to the influence of water vapor or water droplets. In addition, this coating will serve to avoid a leaking of the information contained in the glass fiber which would result in cross-talks effects. Light can no longer leave the fiber at points of irregularity of this fiber and thereby enter neighboring fibers.

Many thousands of individual optical fibers can be combined to form a thin basic optical fiber group 1. Usually, the number of optical fibers will depend on the overall diameter of the finished cable. The cable may have to be of a certain size in order to allow its processing with the machinery which is now used in connection with communications cables. As it is pointed out in FIG. 2, the optical fibers are loosely twisted together with a finite stranding pitch, whereafter the basic group will be provided with a protective sheath 3 which is made of polyethylene with a layer of soot which will protect it against ultra-violet radiation.

Figure 1:
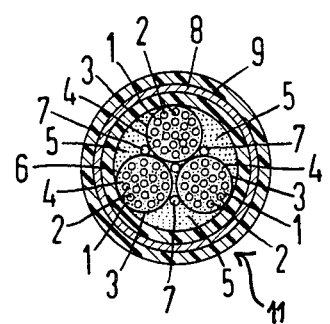
FIG. 1 is a cross section through a cable of optical fibers according to this invention.

As pointed out in FIG. 1, several of these basic groups 1 of optical fibers 2 are taken together to form a cable 11, and tension-relieving elements 7 are added between these basic groups 1. These tension-relieving elements 7 are made of metal or synthetic material of a high strength, and they allow the drawing of the cable into ducts without a risk of damage. It is important that some clearance is left between the basic groups 1 and the tension-relieving elements 7, so that the cable will be more resistant to bending. The cable formed in the above manner has a protective sheath 6 to protect it against water vapor, other vapors or any other outside influences.

Further bending strength is given to the cable formed in the above manner by filling the interspaces 4 between individual glass fibers and the protective layer 3 as well as the interspaces between the basic groups 1, the tension-relieving wires 7 and the protective sheath 6 with lubricants, to allow the fibers and the basic groups to slide in relation to one another and to avoid mechanical damage, as well as to provide another means of preventing optical leakage between neighboring fibers. This lubricant may be a gel-like petroleum derivative.

In addition to the first protective sheath 6 mentioned above, a metal foil such as an aluminum foil 8 is wrapped onto the surface of the sheath 6 to act as a vapor barrier, and a second external protective sheath 9 provides protection against external damage.

In addition, the handling of the basic groups as well as of the individual coated optical fibers, may be fascilitated by distinguishing them from one another by color codings. These are especially helpful during connecting and repair operations.

In the presence of the above individual features, groupe multiplex systems of high information-transmission capacity are obtained which are resistant to all external influences.

We claim:

1. A communication cable with a high transmission capacity comprising:

a plurality of optical fibers, each of said fibers having a protective coating, said plurality of optical fibers being loosely twisted together to define a basic group of optical fibers, a sheath surrounding each basic group of optical fibers, a first protective sheath surrounding a plurality of said basic groups with clearance between said basic groups and said first protective sheath, a metal foil encasing said first sheath, a second sheath surrounding said metal foil, separate tension-relieving wires lying outside of and adjacent to said basic groups within said first protective sheath, and a lubricant filling interspaces between said plurality of optical fibers and said sheath as well as between said basic groups and said first protective sheath so that the optical fibers in each basic group may move relative to each other and each of the basic groups may move relative to each other with an avoidance of mechanical damage.

2. A communication cable with a high transmission capacity comprising:

a plurality of optical fibers, each of said fibers having a protective coating, said plurality of optical fibers being loosely twisted together to define a basic group of optical fibers having interspaces and a substantially circular cross-section;

a first protective sheath surrounding each basic group of optical fibers;

a second protective sheath surrounding a plurality of basic groups of optical fibers with clearance between said basic groups and said second protective sheath to define interspaces therebetween;

a metal foil encasing said second protective sheath;

a third sheath surrounding said metal foil;

a plurality of separate tension relieving wires of substantially smaller cross-section than said basic groups of optical fibers symmetrically arranged outside of and adjacent to said basic groups of optical fibers within said second protective sheath; and a lubricant completely filling said interspaces between said plurality of optical fibers and said first protective sheath of each basic group as well as between said basic groups and said second protective sheath so that the optical fibers in each basic group may slide relative to each other and each of the basic groups may slide relative to each other with an avoidance of mechanical damage.

* * * * *